UNITED STATES PATENT OFFICE.

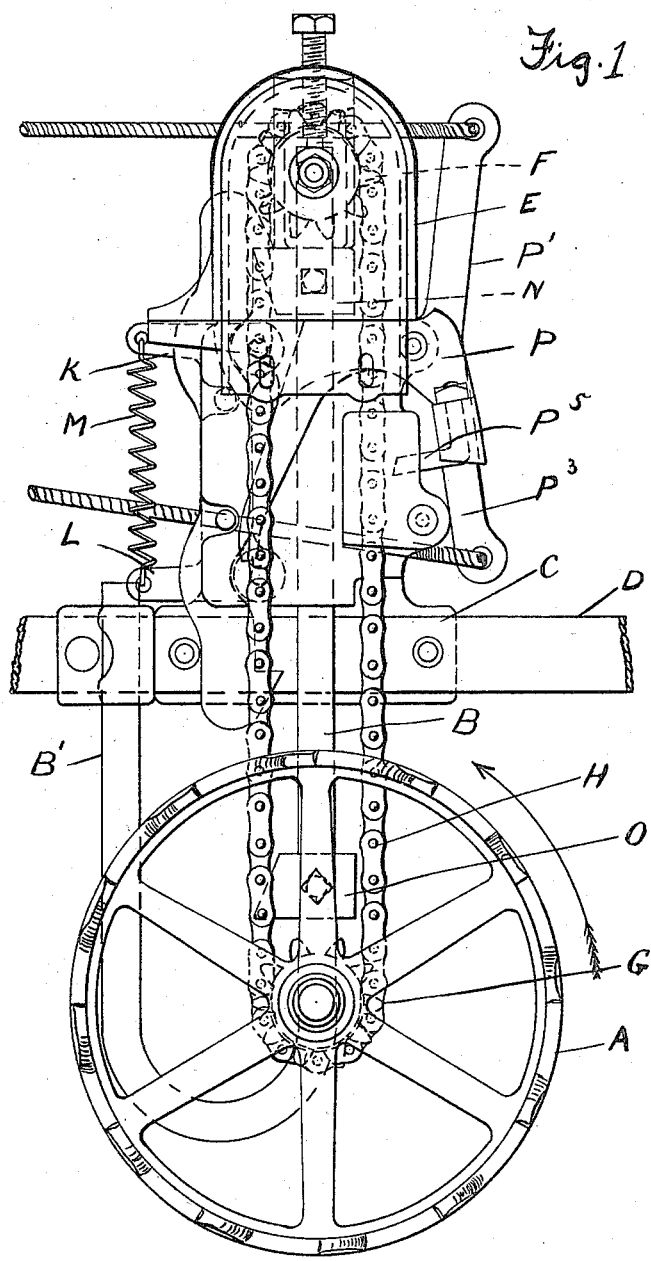

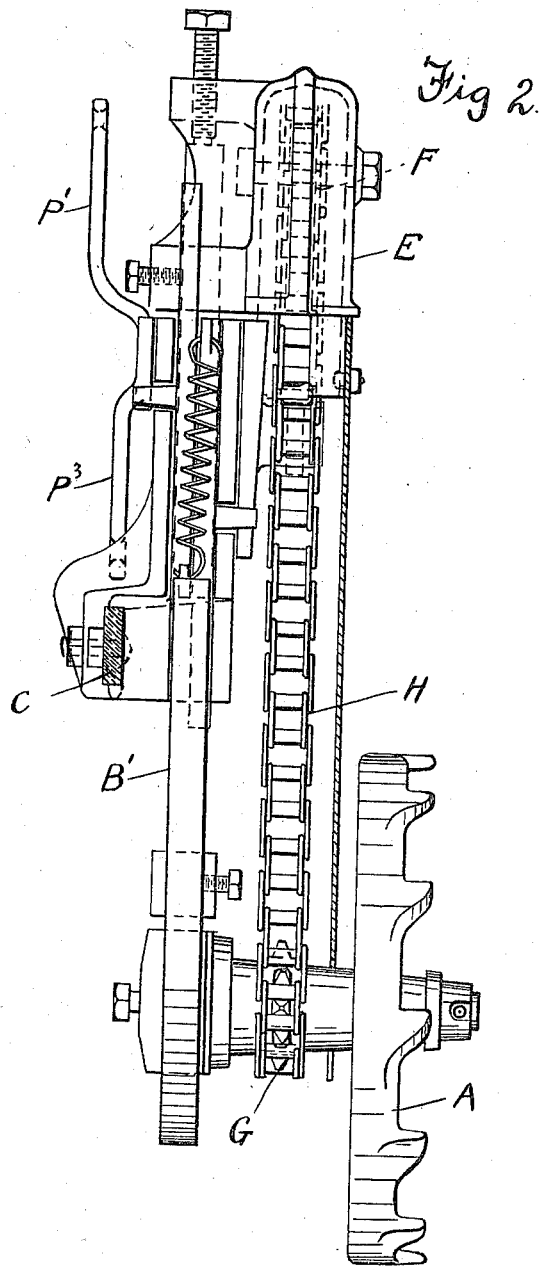

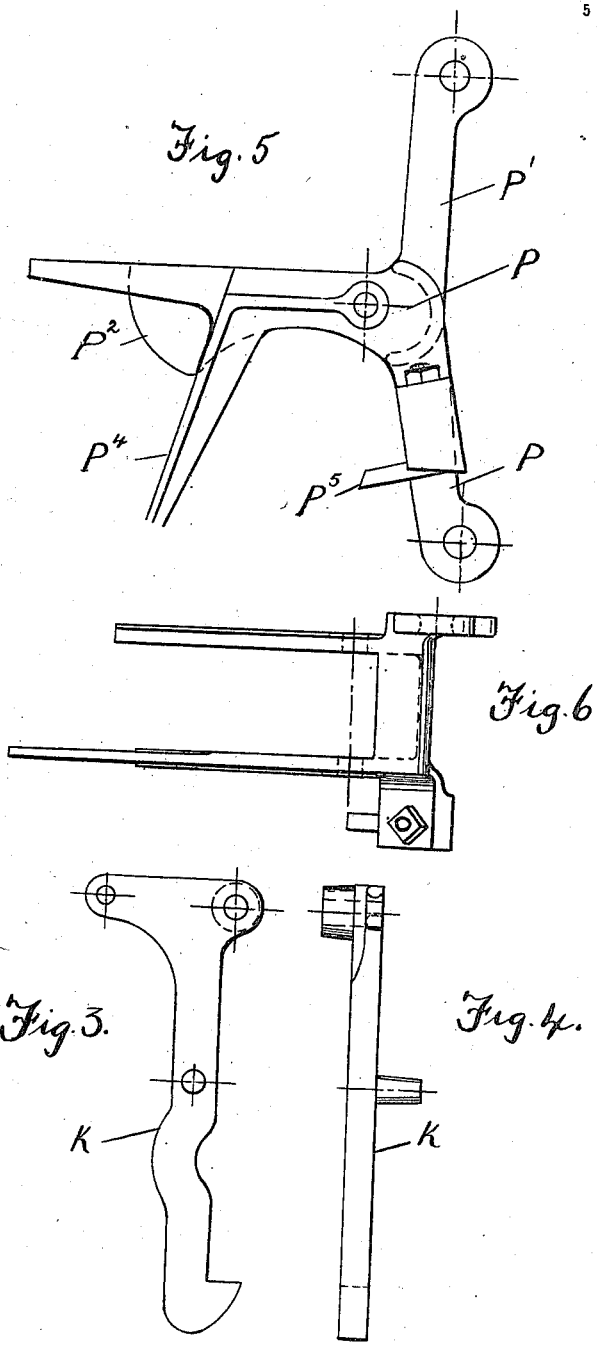

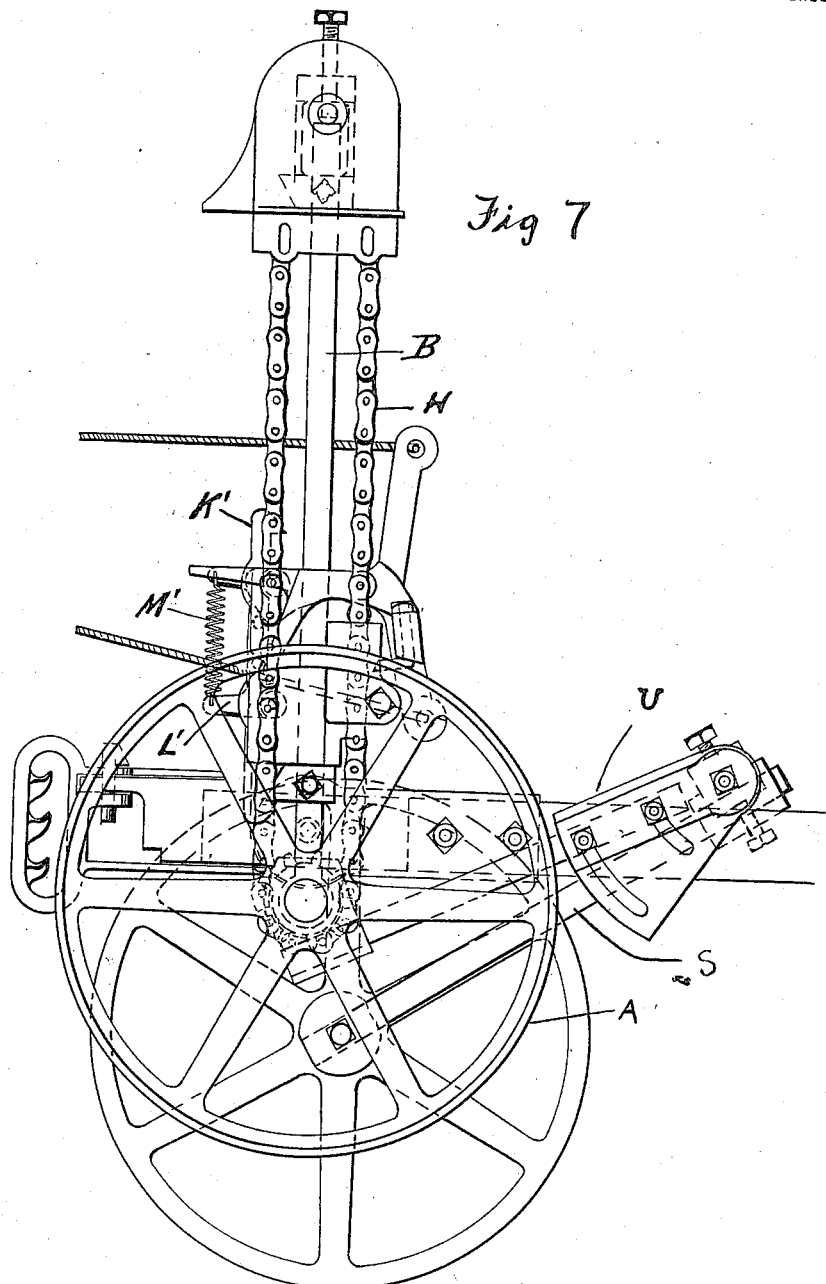

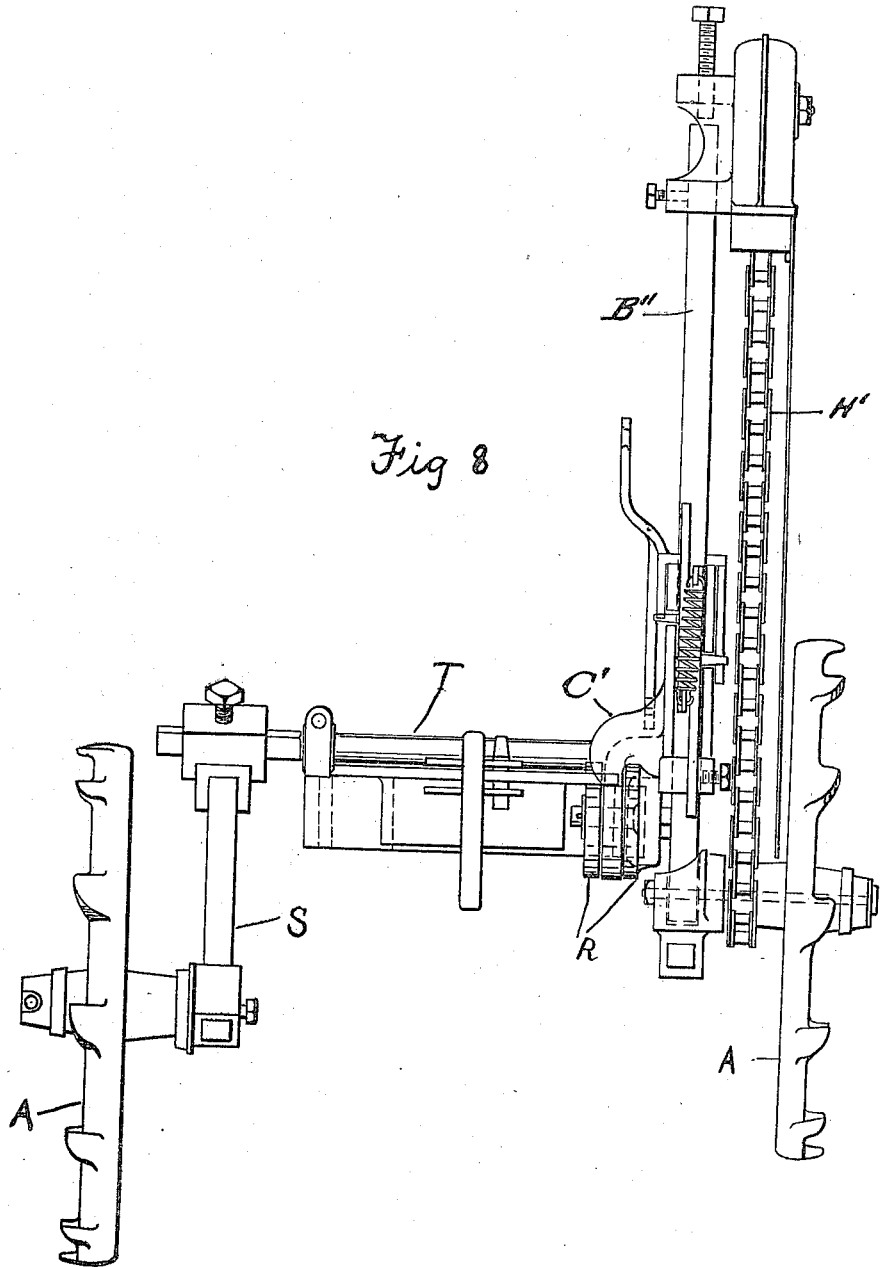

GEORGE COWLEY BINGHAM, OF HEYBRIDGE, MALDON, ENGLAND, ASSIGNOR OF ONE-HALF TO EDMUND ERNEST BENSALL, OF MALDON, ENGLAND.

PLOW.

1,301,365.  Specification of Letters Patent.  Patented Apr. 22, 1919.

Application filed December 31, 1918. Serial No. 269,141.

*To all whom it may concern:*

Be it known that I, GEORGE COWLEY BINGHAM, subject of United Kingdom of Great Britain and Ireland, residing at Heybridge, Maldon, in the county of Essex, England, have invented new and useful Improvements in Plows, of which the following is a specification.

My invention relates more particularly to plows intended for use with motor tractors and it has for its object improved means for raising and lowering the plow as required; as for instance when approaching and leaving a headline.

For this purpose a wheel, by preference the land wheel, is mounted on a stem or slide adapted to slide in a bracket, secured to a convenient part of the plow, in such a manner that the wheel can rise and fall vertically.

An endless chain runs on a sprocket wheel mounted on the boss of the land wheel, and a second sprocket wheel is mounted on the top of the stem or slide of the land wheel so that when said chain is stopped by suitable means the sprocket wheel on the land wheel continuing to draw down the chain as it rotates, draws down with it the land wheel stem or slide and land wheel this raising the plow.

Suitable catches are provided for stopping the travel of the endless chain and for holding the land wheel and its slide in either its raised or lowered position, and these are operated through suitable connections from the driver's seat so that the raising and lowering of the plow is under his immediate control.

The accompanying drawings illustrate the practical application of my invention and I will further describe the same with reference thereto.

Of the drawings Figure 1 is a side elevation, and Fig. 2 an end elevation of my improved means for raising and lowering the land wheel of a plow, while Figs. 3 and 4 and 5 and 6 are respectively a front and a side elevation and a side elevation and a plan of the catch and operating levers detached. Figs. 7 and 8 represent a side elevation and end elevation of a modified form of such mechanism wherein both the land wheel and furrow wheel are raised and lowered as desired.

As shown in Figs. 1, 2, 7 and 8, the land wheel A is journaled in a member or standard B which is adapted to slide in a bracket C on the plow frame D. To insure rigidity this standard is provided with a parallel extension B' which also slides in a suitable guide on the plow frame. The upper end of this carries a housing E having journaled therein a sprocket wheel F on which, and on a second sprocket wheel G an endless chain H runs.

Pivoted in the bracket C on the plow frame are two catch levers K. L. (the former shown detached in Figs. 3 and 4) which are held in position by a spring M so that they normally occupy positions wherein they can engage adjustable stops N O. on the standard B. These two levers are adapted to be operated by a third lever P (shown detached in Figs. 5 and 6) which lever also carries a clutch tooth $p^5$ so placed that it may be brought to engage the endless chain H.

The position of the mechanism as shown is that in which the plow is raised, and is so held by the catch lever K engaging the stop N on the standard B.

The operation of the mechanism shown is as follows:—To lower the plow from the raised position as shown a cord $e$ extended from the driver's seat and connected to the upper arm P' of the lever P is pulled thereby operating the lever to cause a cam face $P^2$ thereon to engage a pin on the catch lever K and so operate same as to cause it to release the stop N on the standard B and to allow the latter to slide in the bracket C until the plow rests on the ground when the catch lever L engages the lower stop O and prevents the plow rising when in work. The land wheel A is thus raised and the plow lowered.

If now it is desired to again raise the plow, as for instance when approaching or leaving a headland, a second cord, extending from the driver's seat and connected to the lower arm $P^3$ on the lever P, is pulled and the lever so operated that an arm $P^4$ thereon engages a pin on the lower catch lever L and so operates said lever as to cause it to release the stop O on the standard B.

At the same time the clutch tooth P⁵ on said lever P is brought into engagement with the endless chain so stopping its travel and causing the sprocket wheel on the land wheel, as the latter rotates, to draw down the chain and with it the upper sprocket wheel its housing, and standard B and consequently the land wheel A; thereby raising the plow. When the frame has been fully raised, the catch lever K automatically engages the stop N.

In the modified form of mechanism shown in Figs. 7 and 8 the endless chain and catch and release mechanism are similar to that above described, the parts H', K', L', and M' corresponding respectively with the parts H, K, L, and M of Figs. 1 and 2, but the standard B'' is arranged to slide in a guide C' hinged at its bottom extremity in a bracket R on the plow frame. The hubs of the land and furrow wheels are also connected by rods or arms S to a bar T journaled across the plow frame so that they are raised and lowered together. The connections between said arms S and cross bar T are made through quadrants U so that the relative heights on the land and furrow wheels may be varied as desired.

Having now particularly described and ascertained the nature of my said invention and in what manner the same is to be performed, I declare that I claim:—

1. The combination of an implement frame, a standard vertically movable thereon, a ground wheel on the standard, a sprocket wheel at the upper end of the standard, an endless chain passing over said sprocket wheel and operatively connected to the ground wheel, a catch lever connected with the frame and having a chain engaging catch and means for moving the lever to engage the catch with the chain to raise the frame and a catch automatically engaging the standard to retain the frame in raised position.

2. The combination of an implement frame, a standard vertically movable thereon, a ground wheel on the standard, a sprocket wheel at the upper end of the standard, an endless chain passing over said sprocket wheel and operatively connected to the ground wheel, a catch lever connected with the frame and having a chain engaging catch and means for moving the lever to engage the catch with the chain to raise the frame.

3. In a plow, the combination of a pair of sprocket wheels, a standard upon which said wheels are mounted, a continuous sprocket chain passing over said wheels, means for rotating said wheels on movement of the plow, an implement frame slidably associated with said standard, means on said frame for engaging said chain to effect movement of the frame with respect to the standard, and means for automatically disengaging the aforesaid means in certain positions of said frame.

4. The combination of an implement frame, a standard vertically movable thereon, a wheel mounted on the lower part of the standard, a sprocket wheel mounted on the upper part of the standard, an endless chain passing over said sprocket wheel and arranged to be driven by the other wheel, means located on the implement frame for engaging said chain to effect movement of the frame with respect to the standard, catches on said frame arranged to engage said standard in certain positions, and means for automatically disengaging the aforesaid means.

5. The combination of an implement frame, a standard vertically movable thereon, a ground wheel on the standard, a sprocket wheel at the upper end of the standard, an endless chain passing over said sprocket wheel and operatively connected to the ground wheel, a catch lever connected with the frame and having a chain engaging catch, means for moving the lever to engage the catch with the chain to raise the frame, and means for automatically disengaging said catch when the frame has been raised to a predetermined point.

In testimony whereof I have signed my name to this specification in the presence of two subscribing witnesses.

GEORGE COWLEY BINGHAM.

Witnesses:
J. PHILLIPS CRAWLEY,
H. C. CARPENTER.

Copies of this patent may be obtained for five cents each, by addressing the "Commissioner of Patents, Washington, D. C."